United States Patent
Blanco

(10) Patent No.: US 7,552,065 B1
(45) Date of Patent: Jun. 23, 2009

(54) FORECASTING TOOL FOR PREDICTING FUTURE DEMAND FOR PARTS / MATERIALS / EQUIPMENT

(75) Inventor: Edgar E. Blanco, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1234 days.

(21) Appl. No.: 09/733,299

(22) Filed: Dec. 8, 2000

(51) Int. Cl.
*G06F 17/30* (2006.01)
(52) U.S. Cl. .......................................... 705/10
(58) Field of Classification Search .................. 705/7, 705/8, 10; 700/99; 707/3
See application file for complete search history.

(56) References Cited

U.S. PATENT DOCUMENTS

| | | | | |
|---|---|---|---|---|
| 5,189,606 A | * | 2/1993 | Burns et al. | 705/10 |
| 5,287,267 A | * | 2/1994 | Jayaraman et al. | 705/10 |
| 5,311,438 A | * | 5/1994 | Sellers et al. | 700/96 |
| 5,408,663 A | * | 4/1995 | Miller | 718/104 |
| 5,450,317 A | * | 9/1995 | Lu et al. | 705/10 |
| 5,548,518 A | * | 8/1996 | Dietrich et al. | 700/100 |
| 5,655,118 A | * | 8/1997 | Heindel et al. | 707/103 R |
| 5,761,674 A | * | 6/1998 | Ito | 707/104.1 |
| 5,797,129 A | * | 8/1998 | Rohan | 705/8 |
| 5,826,252 A | * | 10/1998 | Wolters et al. | 707/1 |
| 5,870,743 A | * | 2/1999 | Cohen et al. | 707/8 |
| 5,878,262 A | * | 3/1999 | Shoumura et al. | 717/164 |
| 5,893,074 A | * | 4/1999 | Hughes et al. | 705/8 |
| 5,918,219 A | * | 6/1999 | Isherwood | 705/37 |
| 5,924,094 A | * | 7/1999 | Sutter | 707/10 |
| 5,950,206 A | * | 9/1999 | Krause | 707/104.1 |
| 6,216,109 B1 | * | 4/2001 | Zweben et al. | 705/8 |
| 6,351,734 B1 | * | 2/2002 | Lautzenheiser et al. | 705/8 |
| 6,415,195 B1 | * | 7/2002 | Gleditsch et al. | 700/99 |
| 6,415,196 B1 | * | 7/2002 | Crampton et al. | 700/100 |
| 6,415,260 B1 | * | 7/2002 | Yang et al. | 705/10 |
| 6,480,836 B1 | * | 11/2002 | Colby et al. | 707/3 |
| 6,571,215 B1 | * | 5/2003 | Mahapatro | 705/8 |
| 6,678,671 B1 | * | 1/2004 | Petrovic et al. | 707/1 |
| 6,711,550 B1 | * | 3/2004 | Lewis et al. | 705/10 |

(Continued)

OTHER PUBLICATIONS

Project Materials Management Primer The Construction Industry Institute Materials Management Task Force, Publication 702, Nov. 1988.*

(Continued)

*Primary Examiner*—Scott L Jarrett
(74) *Attorney, Agent, or Firm*—Fay Kaplun & Marcin, LLP

(57) ABSTRACT

A forecasting tool predicts future demand for quantifiable items in connection with a plurality of projects. The tool has multiple tables, where each table has information therein. In particular, a project table has project information for each project, where the project information includes a reference to items (materials) to be employed in connection with the project. An item table has item information for each item referenced by the project table, where the item information includes a reference to an algorithm to be employed to determine a quantity of the item for a particular project. An algorithm table has algorithm information for each algorithm referenced by the item table. Thus, the quantity of a needed item for a particular project may be determined by determining the specifics of the necessary algorithm, obtaining any inputs necessary for the algorithm from the tables, and applying the inputs to the algorithm.

16 Claims, 3 Drawing Sheets

U.S. PATENT DOCUMENTS 7,117,162 B1 * 10/2006 Seal et al. .................... 705/9
7,174,339 B1 * 2/2007 Wucherer et al. ........... 707/102

OTHER PUBLICATIONS

Ronen, Boaz et al., A Decision Support System for Purchasing Management of Large Projects Operations Research, vol. 36, No. 6, Nov./Dec. 1988, pp. 882-890.*
Passanisi, Peter et al., Materials Procurement Association of Cost Engineers, 1983, Abstract.*
Lansford, Bell C. et al., Materials Management in Industrial Construction Association of Cost Engineers, 1985, Abstract.*
Silver, Edward A., Materials Management in Large-Scale Construction Projects: Some Concerns and Research Issues Engineering Costs and Production Economics, vol. 15, May 1989, Abstract.*
Tavakoli, Amir et al., MMS: A materials management system Construction Management and Economics, vol. 11, 1994, pp. 143-149.*
Marquardt, Thomas R., Total cost of ownership via effective materials management Transactions of AACE International, 1994.*
SP4-Project Materials Management Handbook Construction Institue, Retrieved from Construction-institute.org on Apr. 23, 2007.*
IR7-3—Procurement and Materials Management: A Guide to Effective Project Execution Construction Institute, Retrieved from construction-institute.org.*
Elmasri, Ramez et al., Fundamentals of Database Systems—Third Edition Addison-Welsey, 2000, ISBN: 0-8053-1775-4.*
Hendrickson, Chris, Project Management for Construction Prentice Hall, 1998, ISBN 0-13-731266-0.*
Opfer, Neil D., Just-In-Time Construction Materials Management AACE Internation Transactions, 1998.*
Aquilano, Nicholas J. et al., A format set of algorithms for project scheduling with critical path scheduling/material requirements planning, Journal of Operations Management, vol. 1, No. 2, Nov. 1980, Abstract.*
Smith, Dwight Edward, A Combined Critical Path Method—Material Requirements Planning Model For Project Scheduling Subject to Resource Constraints, The University of Arizona, 1980, AAT 8027741, Abstract.*
Smith, Dwight E. et al., Contrained resource project scheduling subject to material constraints Journal of Operations Management, vol. 4, No. 3, Aug. 1984, Abstract.*
Cook, Robert R., Computerized Materials Management for Engineering/Construction Projects American Association of Cost Engineers, 1984, Abstract.*
Marsh, Jon W., Materials Management: Practical Application in the Construction Industry Cost Engineering: vol. 27, No. 8, Aug. 1985, Abstract.*
Smith-Daniels, Dwith E. et al., Optimal Project Scheduling with Materials Ordering IIE Transactions, vol. 19, No. 2, Jun. 1987, Abstract.*
Shtub, Avraham, The Integration of CPM and material management in project management Construction Management and Economics, vol. 6, 1988, pp. 261-272.*
Bragg, Daniel J. et al., Material requirements planning and purchasing Journal of Purchaing and Materials Management, vol. 25, No. 1, Spring 1989.*
Imam, Muhammad H., Project Management in Telecommunications American Association of Cost Engineers, 1990.*
Puckett, James C. et al., Cradle-to-Grave Material Management Association of Cost Engineers, 1991.*
Berka, John H. et al., Materials management: a comprehensive system Transactions of AACE International, 1994.*
Akintoye, Akintola, Just-in-Time application and implementation for building material management Construction Management and Economics, Oct. 1995, vol. 13, pp. 105-113.*
Graham, Kenneth A., CostTrack Cost Engineering, vol. 42, No. 9, Sep. 2000, pp. 23, 25.*
Clough, Richard H. et al., Construction Project Management John Wiley & Sons, 2000, ISBN: 0-471-32438-8.*
Krajewski, Lee J. et al., Operations Management Addison-Wesley, 1996, ISBN: 0-201-82293-8.*
Marsh, Jon, Materials Management: Practical Application in the Construction Industry Cost Engineering, vol. 27, No. 8, Aug. 1985.*
Smith-Daniels, Dwight, E. et al., Optimal Project Scheduling with Materials Ordering IIE Transactions, vol. 19, No. 2, Jun. 1987.*
Smith-Daniels, Dwight E. et al., Constrained Resource Project Scheduling Subject to Material Constraints Journal of Operations Management, vol. 4, No. 4, Aug. 1984.*
Aquilano, Nicholas, J., A Formal Set of Algorithms For Project Scheduling With Critical Path Scheduling/Material Requirements Planning, Journal of Operationsl Management, vol. 1, No. 2, Nov. 1980.*
Cook, Robert R., Computerized Materials Management for Engineering/Construction Projects AACE Transactions, 1984.*

* cited by examiner

FORECASTING TOOL FOR PREDICTING FUTURE DEMAND FOR PARTS / MATERIALS / EQUIPMENT

FIELD OF THE INVENTION

The present invention relates to a forecasting tool for predicting future demand for parts/materials/equipment in connection with an ongoing project or operation. More particularly, the present invention relates to such a forecasting tool that includes a relational database including historic demand information, supplier information, and requirements information.

BACKGROUND OF THE INVENTION

In a relatively complex and ongoing project, it is very useful to be able to predict future demand for materials, parts, and equipment and the like (hereinafter 'materials') that will be employed in connection with the project. Accordingly, such materials can be ordered from appropriate suppliers and received in a timely manner. Thus, the materials are available to the project when needed, and the project is not hindered due to material shortages. Likewise, such materials as received from the suppliers need not be stored or warehoused for a relatively long time, and capital required to purchase such materials is not unnecessarily expended any sooner than necessary.

One example of such an ongoing project is the ongoing replacement in a telephone network of twisted-pair copper wire customer loops with fiber-optic cable customer loops. That is, in a typical telephone network, the lines running between central offices and associated telephone service subscribers have typically been twisted-pair copper wire lines. However, to accommodate the demand for higher capacity and better service, among other things, such copper wire lines are now being replaced with fiber-optic lines. Moreover, as new housing and office developments are constructed, fiber-optic lines are installed from central offices to such developments to accommodate expected service needs.

As should be appreciated, whether changing existing service from copper wire to fiber-optic or installing new fiber-optic service, materials needs are substantial. More conspicuously, fiber-optic cabling is needed, as is the infrastructure necessary to route the fiber-optic cabling from the central offices to the subscribers. Such infrastructure may comprise telephone poles and/or underground conduits, mounting devices for mounting and securing the fiber-optic cabling along the chosen paths between the central offices and the subscribers, and the like, among other things. Less conspicuously, service equipment is needed at the central offices to provide services to subscribers, including interconnecting equipment for interconnecting the fiber-optic cabling to the telephone network and subscriber service equipment for providing services to the subscribers over the fiber optic cabling. Additionally, service equipment is needed at intermediate points between the central offices and the subscribers, including breakout equipment for breaking out lines from a main fiber-optic cable serving multiple subscribers to individual fiber-optic cables serving individual subscribers.

Moreover, the service equipment must be housed within appropriate structures, and such structures must be either constructed in situ or purchased and installed in situ. As may be appreciated, such structures may in fact comprise a new central office or an addition to a central office, breakout boxes mounted to structures such as telephone poles for housing relatively small amounts of breakout equipment, and/or above- and/or below-ground breakout vaults for housing relatively large amounts of breakout equipment.

As should be understood, then, in a typical local, regional, or national telephone system ongoing project, and in other typical ongoing projects, many other material needs exist. Thus, it can become a mammoth undertaking to plan for materials for such ongoing projects, as well as for other project needs including labor needs and other support needs. Accordingly, a need exists for a forecasting tool that accurately predicts future demand for parts/materials/equipment in connection with an ongoing project or operation, where such forecasting tool predicts such demand based on factors including historic demand, supplier availability, project requirements, and the like.

SUMMARY OF THE INVENTION

In the present invention, the aforementioned need is satisfied by a forecasting tool for predicting future demand for quantifiable items in connection with a plurality of projects. The tool has multiple tables, where each table has information therein. In particular, a project table has project information for each project, where the project information includes a reference to items (materials) to be employed in connection with the project. An item table has item information for each item referenced by the project table, where the item information includes a reference to an algorithm to be employed to determine a quantity of the item for a particular project. An algorithm table has algorithm information for each algorithm referenced by the item table. Thus, the quantity of a needed item for a particular project may be determined by determining the specifics of the necessary algorithm, obtaining any inputs necessary for the algorithm from the tables, and applying the inputs to the algorithm.

BRIEF DESCRIPTION OF THE DRAWINGS

The foregoing summary, as well as the following detailed description of preferred embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF PREFERRED EMBODIMENTS

Figure 1:
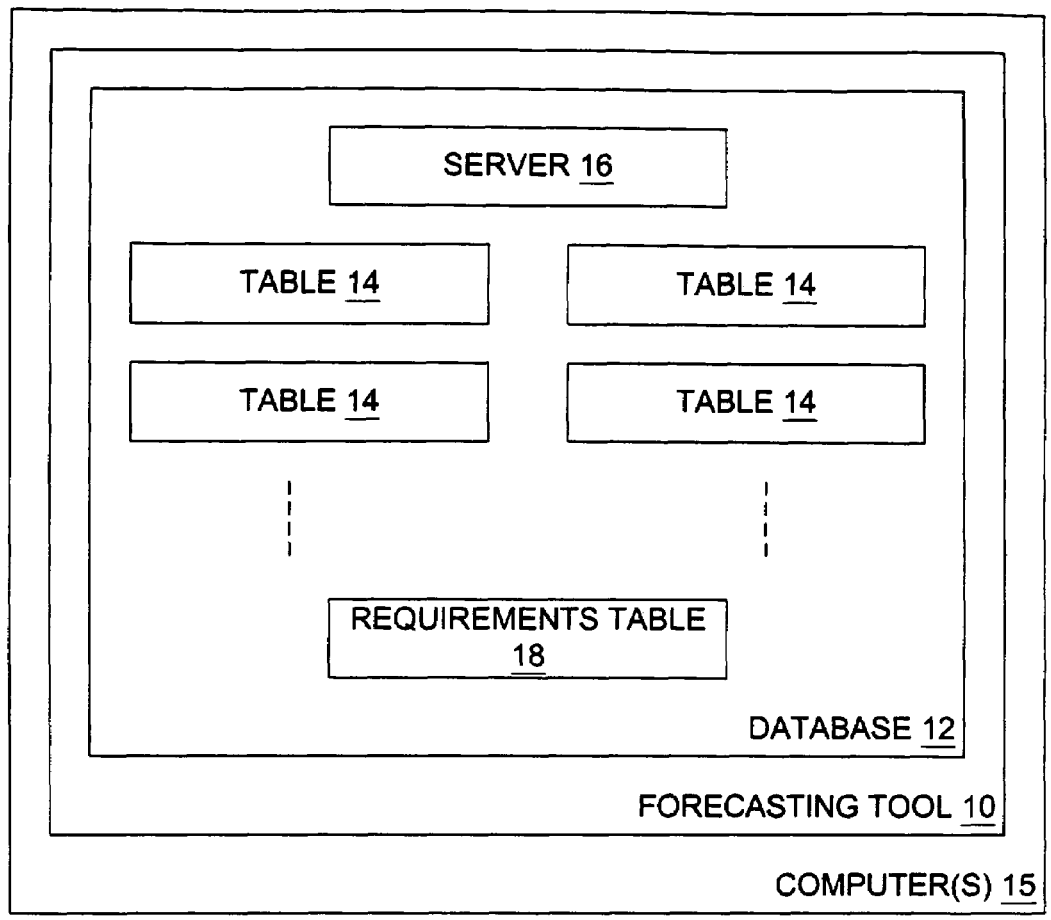
FIG. 1 is a block diagram showing a forecasting tool in accordance with one embodiment of the present invention.

Referring now to FIG. 1, a forecasting tool 10 employed to predict future demand for parts/materials/equipment (hereinafter 'materials') is shown in accordance with one embodiment of the present invention. As can be seen, the tool 10 is instantiated in the form of a database 12 having multiple table entities 14. Such database table entities, or tables, 14 may reside on a single computer 15 or may be distributed across several computers 15. As will be discussed in more detail below, in the case where the database 12 includes tables 14 supplied by external sources (suppliers, e.g.), such tables 14 are likely in fact located on several computers 15, where such computers 15 may physically reside large distances away from each other. Accordingly, appropriate communications devices are employed to interlink the entities as necessary. Such communications devices are known to the relevant public and therefore need not be discussed herein in any detail.

As maybe generally appreciated, each computer 15 as discussed above typically has a memory and an operating system, and a computer application is instantiated on the computer 15 in the form of one or more application processes running in a work space in the memory as managed by the operating system. Notably, any appropriate computer, operating system, and application may be employed without departing from the spirit and scope of the present invention. For example, the computer 15 may be a mainframe computer, a mini-computer, a desktop- or laptop-based personal computer; or the like; and the operating system may be a LINUX-based operating system, a WINDOWS-based operating system, a UNIX-based operating system, or some other operating system.

Especially in the case where the tables 14 of the database 12 are distributed, a central database server 16 may be employed to control and coordinate the database 12. Generally, the database 12, its tables 14, and the central server 16 may be any appropriate databases 12, tables 14, and servers 16 without departing from the spirit and scope of the present invention. For example, the database 12, tables 14, and server 16 may be of an appropriate type as designed and/or marketed by a database supplier such as ORACLE Corporation of Redwood Shores, Calif. Alternatively, the database 12 and tables 14 in particular may be based on MICROSOFT ACCESS database technology and/or MICROSOFT EXCEL spreadsheet technology and the associated programming may be based on MICROSOFT VISUAL BASIC programming technology, all as designed and/or marketed by MICROSOFT Corporation of Redmond, Wash. In addition, tables 14 as described herein may be combined into larger tables 14 or divided into smaller tables 14 without departing from the spirit and scope of the present invention. Likewise, the computers 15 on which the entities 14 of the database 12 and the server 16 reside may be any appropriate computers without departing from the spirit and scope of the present invention.

Generally, an ongoing project such as of the type of the present application is executed according to an overall plan, such as for example a business plan, and the project (hereinafter 'overall project') is at least administratively broken down into a plurality of sub-projects (hereinafter 'projects'). For example, the overall project may be the aforementioned fiber-optic installation over an entire telephone network, while each project may comprise a fiber-optic installation for a particular zone, region, grid, exchange, central office, sub-division, or the like. Moreover, there may be a variety of types of projects. For example, fiber-optic installation projects may include new installation projects, retrofit projects (i.e., where the old copper wire lines are left in place), overbuild projects (i.e., where the old copper wire lines are removed), and the like. As may be appreciated, the actual administrative planning of the overall project and the individual projects may be done in any particular manner without departing from the spirit and scope of the present invention.

As should be appreciated, based on the type of project, different materials are needed. For example, new telephone poles are needed for a new project, but not for a retrofit. Likewise, depending on the size of the project, different amounts of materials are needed, and such amounts are calculated based on particular algorithms. For example, a project for a sub-division of 100 houses likely needs less fiber-optic cabling than a project for a sub-division of 200 houses, although not necessarily half as much. In addition, different materials are required at different stages or milestones of the project. For example, for a particular type of project, a particular material is not needed until after a structure has been constructed. Finally, suppliers supplying materials require certain amounts of lead-time to produce and deliver the materials, and also may only have so much capacity for producing and delivering such materials. For example, a supplier may be able to deliver 2000 units of a material in any month, with 60 days lead-time, while another may be able to deliver 7000 units with 30 days lead-time in summer months and 4000 units with 45 days lead-time in winter months.

Figure 2:
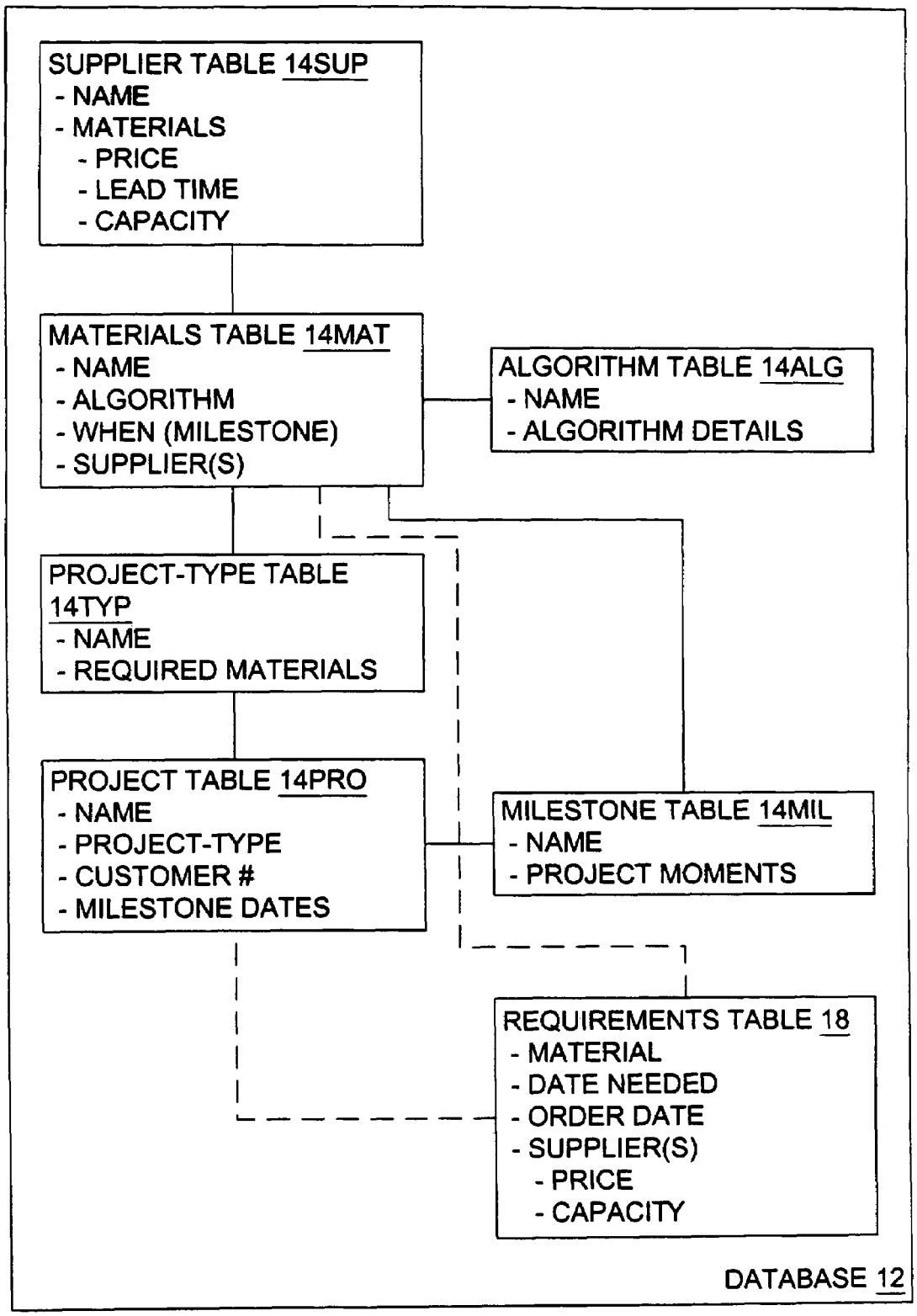
FIG. 2 is a block diagram of the database of the tool of FIG. 1.

In one embodiment of the present invention, then, factors such as those described above and others are taken into consideration in forecasting demands for materials for a project. In particular, and referring now to FIG. 2, in such embodiment, such factors are noted in the tables 14 of the database 12. As shown in FIG. 2, the various tables 14 of the database 12 are interconnected according to relationships between the information in such tables. It is to be appreciated that such interconnections do not necessarily reflect the flow of information in such database 12.

Relevant information must be loaded into each table 14 of the database 12. Moreover, such relevant information must be updated and/or corrected in a timely manner in order that the database 12 be accurate and that forecasts of demand as derived from the database 12 are accurate. Such information may be loaded/updated/corrected in any particular manner without departing from the spirit and scope of the present invention. It is to be understood that the relevant public knows or readily appreciates how to load such information into the database 12. Accordingly, the specific procedures and devices employed to load the database 12 are not set forth herein in any detail.

Generally, the database 12 is loaded according to information already available or readily derivable from information already available. For example, information from the overall project plan may be employed as project-type information and milestone-type information, information on materials needed may be employed as materials-type information, information on materials suppliers may be employed as supplier-type information, etc.

More specifically, and still referring to FIG. 2, in one embodiment of the present invention, one table 14 is a project table 14pro which includes project information for each project. Such project information for each project may include but is not limited to a name and/or identifier for the project, the project-type of the project, the number of customers to be serviced by the project, milestone dates for the project, and other relevant project-related information for the project. The name and/or identifier for the project may be obtained from the overall project plan, or may be randomly assigned. The project-type of the project and the number of customers to be serviced by the project may likewise be obtained from the overall project plan, or may be determined based on such plan in combination with other available information. Milestone dates for the project may also be obtained from the overall plan, although if the plan does not provide such information, which is often the case, such dates may be scheduled or estimated based on other information.

The project table 14pro bears a relationship to a project-type table 14typ in that the project-type table 14typ includes information for each type of project. Such project information for each type of project may include but is not limited to a name and/or identifier for the project-type, the materials required for the project-type, and other relevant project-type-related information for the project-type. The name and/or identifier for the project-type may be pre-determined or randomly assigned, and for example may include new, overbuild, and retrofit project-types as discussed above. The materials required for the project-type is a list that is constructed based on experience (i.e., previous projects of the same project-type) and also on any new materials requirements for the project-type based on new types of construction methods, new services, new regulations, etc.

The project-type table 14typ bears a relationship to a materials table 14mat in that the materials table 14mat includes information for each material specified in the project-type table 14typ. Such material information for each material may include but is not limited to a name and/or identifier for the material, an identification of an algorithm that is to be employed to determine a quantity of the material required for a particular project, an identification of when the material is required in terms of a project milestone, an identification of one or more suppliers that supply the material, project-types that employ the material, and other relevant material-related information for the material. The name and/or identifier for the material may be pre-determined or randomly assigned. The identification of when the material is required specifies a calculation of a date based on one or more milestones (e.g., two weeks prior to a milestone date but not more than three days after another milestone date).

The materials table 14mat bears a relationship to an algorithm table 14alg in that the algorithm table 14alg includes the quantity determination algorithms as specified by each material listed in the material table 14mat. As may be appreciated, multiple materials in the materials table 14mat may specify the same algorithm in the algorithm table 14alg. Each algorithm has a name and/or identifier which may be pre-determined or randomly assigned, and may be any appropriate type of algorithm without departing from the spirit and scope of the present invention. As one example, an algorithm may calculate a quantity of a material based on a mathematical calculation. In such case, the inputs for the calculation must be available from one of the tables 14 of the database 12 or elsewhere. Such calculation may also be based on a quantity calculated for another material, in which case such another material quantity must first be calculated. As another example, the algorithm may include a reference to a look-up table.

The materials table 14mat also bears a relationship to a supplier table 14sup in that the supplier table 14sup includes information on the suppliers that supply the materials listed in the material table 14mat. As may be appreciated, multiple materials in the materials table 14mat may be supplied by one supplier in the supplier table 14sup, and multiple suppliers may supply one material. Each supplier has a name and/or identifier which may be pre-determined or randomly assigned, and supplier information for such supplier as stored in the supplier table 14sup may include but is not limited to the materials supplied by the supplier, material prices, lead-time necessary for supplying each material, and capacity for supplying each material. For example, and as was disclosed above, a supplier may be able to deliver 2000 units of one material in any month, with 60 days lead-time, while another may be able to deliver 7000 units of another material with 30 days lead-time in summer months and 4000 units of the another material with 45 days lead-time in winter months.

It is likely that the information in the project table 14pro, the project-type table 14typ, the materials table 14mat and the algorithm table 14alg, as heretofore disclosed, is updated and maintained by the manager of the overall project or an agent thereof. With regard to the supplier table 14sup, though, it is to be appreciated that the information in such supplier table 14sup may be updated and maintained by the aforementioned project manager or agent thereof, by each supplier or an agent thereof, or by a combination thereof. For example, each supplier may regularly update material prices. All of such information may of course be updated and maintained by others without departing from the spirit and scope of the present invention.

The materials table 14mat further bears a relationship to a milestone table 14mil in that the milestone table 14mil includes the milestone information referred to by the materials listed in the material table 14mat. Milestones define key project moments when project materials are needed, and may include any project moment that requires a material to begin, or any project moment that requires a material to be accomplished, such as for example a start date, an end date, a structure placement date, etc. As may be appreciated, multiple materials in the materials table 14mat may have a relationship with one milestone in the milestone table 14mil, and one material may be required at multiple milestones. As may also be appreciated, the milestone table 14mil bears a relationship to the project table 14pro in that the milestone table 14mil includes the milestone information referred to by the milestone dates listed in the project table 14pro. Each milestone has a name and/or identifier which may be pre-determined or randomly assigned, and may for example comprise a start date, an end date, a structure completion date, etc.

With the project table 14pro, the project-type table 14typ, the materials table 14mat, the algorithm table 14alg, the supplier table 14sup, and the milestone table 14mil as heretofore disclosed, and in one embodiment of the present invention, the database 12 is further supplied with a requirements table 18 that is to be populated on a dynamic basis in response to a query for a forecast for materials requirements. In particular, based on the query, information from the various tables 14 is obtained and is employed to fill the requirements table 14 with data responsive to the query. Thus, the populated requirements table 18 is the result as obtained from the forecasting tool 10.

The data responsive to the query (i.e., 'the forecast') in the populated requirements table 18 may be organized in any particular manner without departing from the spirit and scope of the present invention, although it is to be appreciated that such organization may be at least somewhat constrained by the query. For example, if the query is a twelve month future demand for a particular material for all projects, the populated requirements table 18 may list an amount of the material required for each project and the date when the material is needed for each project, where the date is within the twelve month period.

Moreover, based on lead-time information from the database 12, the requirements table 18 may also list the date when the material must be ordered for each project. Further, based on the supplier information from the database 12, the requirements table 12 may additionally list which supplier or suppliers the material is to be ordered from. Of course, there may be considerations and/or circumstances that would require a deviation in that the material is to be ordered from a supplier other than that listed in the requirements table 14. For example, a listed supplier may be deemed unreliable or untrustworthy, or is not to be favored because of its prices, or simply may not deliver the material where it is required. Accordingly, it is expected that the requirements table 18 as populated in response to a particular query may be reviewed by knowledgeable personnel to ascertain whether any deviations are necessary.

As may be appreciated, the requirements table 18 is populated in response to a query by obtaining data from the database 12 and the tables 14 thereof on a relational basis. That is, such data is generally obtained from the tables 14 of the database 12 by logically starting at one table and following relationships between tables 14 (i.e., the connecting lines of FIG. 2) to obtain related data. The process continues until all available and required information has been gathered. Note that based on the particular query, it may be more reasonable to start at one table 14 versus another table 14. Correspondingly, based on the particular query, it may be reasonable to start at any one of a plurality of the tables 14.

Figure 3:
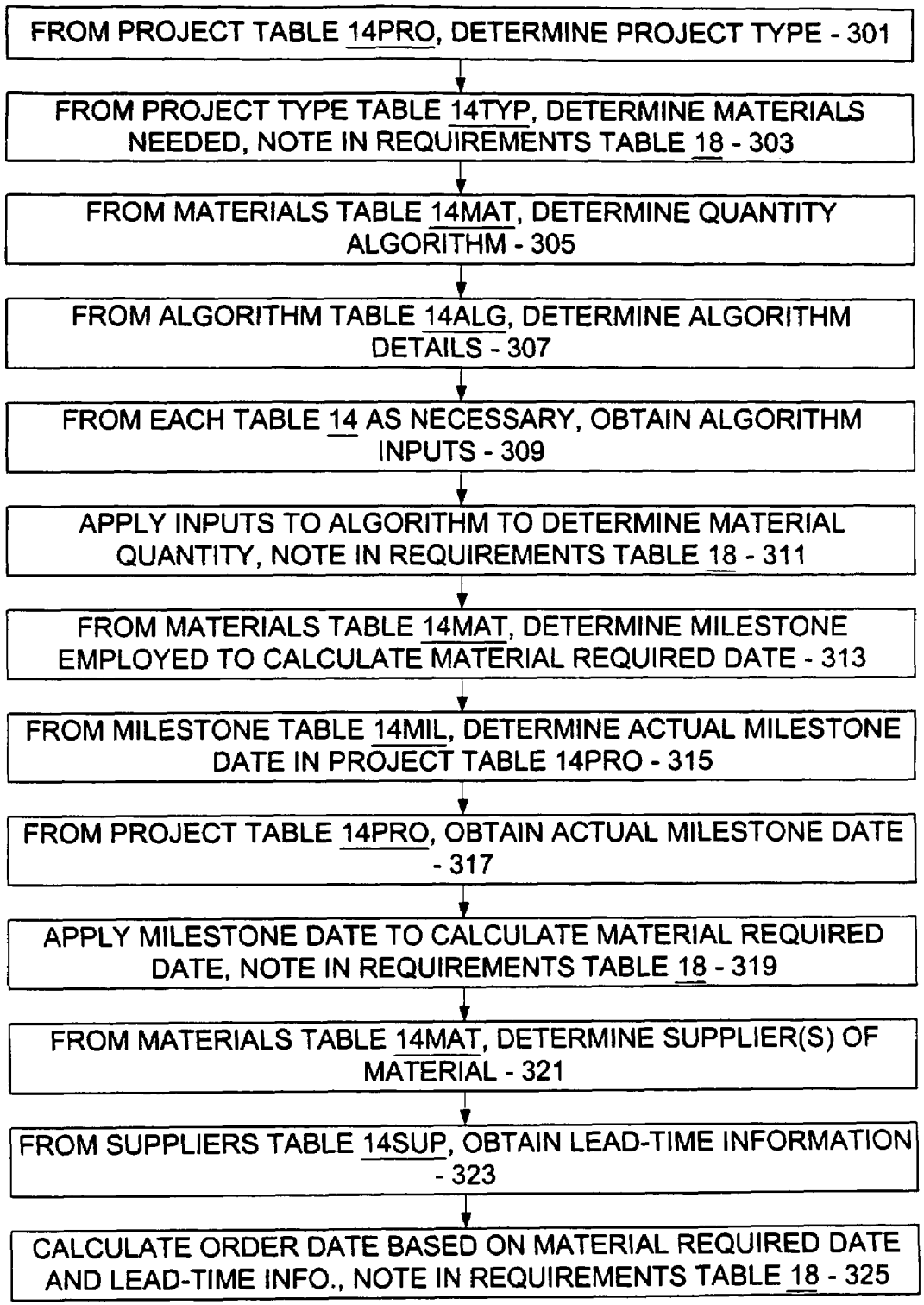
FIG. 3 is a flow diagram showing steps performed during traversal of the database of FIG. 2 in response to a particular query.

For example, and referring now to FIG. 3, in response to the relatively simple query "What materials are required for project A, how much of each material is required, and when is each material required?", the following process may be performed to populate the requirements table 18 with the required information and thereby predict such future material demands:

1. From the project table 14pro, determine the project type of Project A (step 301);
2. From the project type table 14typ, determine the materials needed according to the project type of Project A and note such materials in the requirements table 18 (step 303); and
3. For each needed material in the requirements table 18:
    a. From the materials table 14mat, determine the algorithm necessary to determine the amount of the material needed (step 305);
    b. From the algorithm table 14alg, determine the specifics of the algorithm (step 307);
    c. From each table 14 as necessary, obtain any inputs necessary for the algorithm, such as for example input information available from the project table 14pro for Project A (step 309);
    d. Apply the inputs to the algorithm to determine the amount of the material needed and note such amount in the requirements table 18 (step 311);
    e. From the materials table 14mat, and perhaps from the project-type table 14typ, determine which milestone is employed to calculate the date on which the material is required (step 313);
    f. From the milestone table 14mil, determine which date in the corresponding project table 14pro is the actual milestone date (step 315);
    g. From the project table 14pro, obtain such milestone date (step 317); and
    h. Apply the milestone date to calculate the date on which the material is required and note such date in the requirements table 18 (step 319).

As may be appreciated, the aforementioned query could be modified to "What materials are required for project A, how much of each material is required, when is each material required, and when should each material be ordered?", by performing the following additional steps for each needed material in the requirements table:

i. From the materials table 14mat, determine the supplier(s) of such material (step 321); and
j. For each supplier:
    1. From the suppliers table 14sup, obtain lead-time information for supplying the material (step 323); and
    2. Calculate a date based on the material requirement date and the lead-time information and note such date in the requirements table 18 (step 325).

In a similar manner, pricing and/or capacity information may for example be added to the future material demand data in the requirements table 18. Most any query may thus be answered based on the forecasting tool 10, assuming the tool 10 includes the information necessary to answer the query. For example, the query may be based on a single material across multiple projects, multiple materials across a single project-type, multiple materials across multiple projects or project-types, etc. Note, too, that based on the relationships of the tables 14 in the database 12 of the tool 10, the query may be answered in any of several different traversals. For example, rather than starting with the project table 14pro, a query might be answered by starting with the materials table 14mat. Of course, the starting point may be dictated by the query, and may also be selected based at least in part on common sense.

Figure 4:
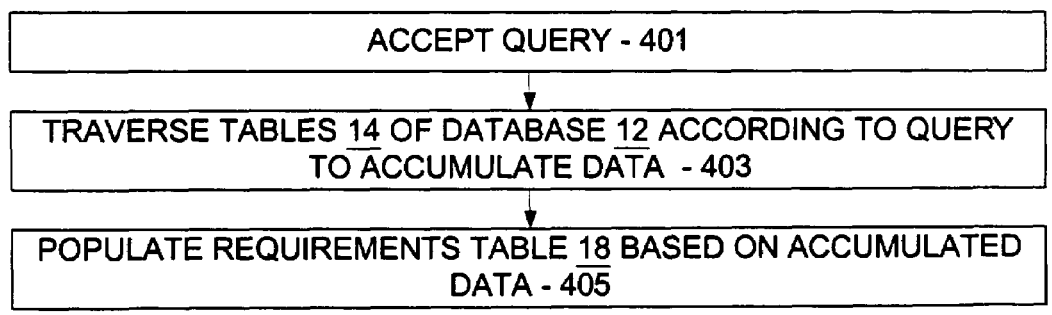
FIG. 4 is a flow diagram showing steps generally performed to employ the database of FIG. 2 and tool of FIG. 1.

Generally speaking, then, and referring now to FIG. 4, in one embodiment of the present invention, the tool 10 populates the requirements table 18 by accepting a properly phrased query (step 401); traversing the tables 14 of the database 12 according to the query to accumulate the data necessary to populates the requirements table 18 (step 403); and in fact populating the requirements table 18 based on the accumulated data from the tables 14 of the database 12 (step 405). Note here that a query is properly phrased based on the input requirements of the tool 10. Inputting of queries and phrasing of such queries is known or should be apparent to the relevant public and therefore need not be discussed herein in any detail.

The programming necessary to effectuate the present invention, such as the programming necessary to set up the tables 14 and to operate the tool 10 by accepting queries, traversing the database 12, and populating the requirements table 18, is known or should be readily apparent to the relevant public. Accordingly, further details as to the specifics of such programming are not believed to be necessary herein.

As should now be understood, in the present invention, a forecasting tool is provided to predict future materials demands for an overall project. Changes could be made to the embodiments described above without departing from the broad inventive concepts thereof. For example, instead of or in addition to predicting future materials demands, future labor demands, future time demands, and other future demands for quantifiable items may also be predicted in a similar manner. It is understood, therefore, that this invention is not limited to the particular embodiments disclosed, but it is intended to cover modifications within the spirit and scope of the present invention as defined by the appended claims.

The invention claimed is:

1. A computer-readable medium having stored thereon computer-executable instructions for instantiating a forecasting tool for predicting future demand for quantifiable items in connection with a plurality of projects, the tool being instantiated on at least one computer in the form of a database having multiple tables, each of the multiple tables having information therein, wherein instantiating the forecasting tool comprises:

receiving a query from a user to the tool, accessing the database having multiple tables, receiving a selection of at least one milestone to be employed with one of the projects, the at least one milestone originating from a milestone-type table, wherein the milestone is associated with a change of at least one milestone-related material and the milestone includes an amount of milestone-related material required for the project and a projected milestone start date and a projected milestone end date;

determining an actual milestone date from the milestone-type table;

calculating a material required date of milestone-related material based on the actual milestone date and the projected milestone start date and the projected milestone end date;

determining a supplier for the material from a material table;

obtaining a lead-time for supplying the material based on a suppliers table;

calculating an order date based on the material required date and the lead-time;

populating a requirements table according to the calculated order date, and outputting the requirements table and the order date to a display, and the multiple tables comprising:

a project table having project information for each project, the project information including: a reference to at least one item to be employed in connection with the project, and an identification of a project-type of the project;

a project-type table having project-type information for each project-type referenced by the project table, the project-type information comprising a list including each item to be employed in connection with the project-type, wherein the list is constructed based on:

at least one telecommunications infrastructure requirement for the project-type;

at least one previous project of a same project-type, and at least one new material requirement for the project-type based on at least one of the following: a new type of construction method, a new service, or a new regulation;

an item table having item information for each item referenced by the project table, the item information including a reference to an algorithm to be employed to determine a quantity of the item for a particular project;

an algorithm table having algorithm information for each algorithm referenced by the item table, the requirements table populated by the forecasting tool on a dynamic basis with information obtained from the multiple tables in response to a query for demand for items, the tool populating the requirements table by accepting the query, traversing the multiple tables of the database according to the query to accumulate data necessary to populate the requirements table, and populating the requirements table based on the accumulated data, wherein the requirements table is output to the display by the forecasting tool for viewing by personnel.

2. The medium of claim 1 wherein the quantifiable items are selected from a group consisting of parts, materials, equipment, labor time, and combinations thereof.

3. The medium of claim 1 wherein the database tables are distributed across several computers.

4. The medium of claim 3 wherein the forecasting tool further comprises a database server for controlling and coordinating the database.

5. The medium of claim 1 wherein the item information further includes a reference to the milestone information in the milestone table and information on how to calculate a date when the item is required based on the milestone information.

6. The medium of claim 1 wherein the item information further includes an identification of at least one supplier, the tables further comprising a supplier table having supplier information for each supplier referenced by the item table, the supplier information including the items supplied by the supplier and information foe each supplied item.

7. The medium of claim 6 wherein the information for each supplied item is selected form a group consisting of item prices, lead-time necessary for supplying the item, and capacity for supplying the item.

8. The medium of claim 1 wherein the algorithm information for each algorithm is selected for a group consisting of: algorithm information that calculates a quantity of an item based on a mathematical calculating and available from the tables of the database; algorithm information that calculates a quantity of an item based on a quantity calculated for another item; algorithm information that refers to a look-up table; and combinations thereof.

9. The medium of claim 1 wherein the requirements table is populated with information including a project, an item for the project, and an amount of the item required for the project.

10. The medium of claim 9 wherein the requirements table is further populated with information including the date when the item is needed for the project.

11. The medium of claim 10 wherein the requirements table is further populated with information including the date when the item must be ordered to satisfy the date when the item is needed.

12. The medium of claim 9 wherein the requirements table is further populated with information including a supplier the item is to be ordered from.

13. A computer-readable medium having stored thereon computer-executable instructions which, when executed by a computer, perform a method of employing a forecasting tool for predicting future demand for quantifiable items in connection with a plurality of projects, comprising:

receiving a query for demand for an item, accepting the query, receiving a selection of at least one milestone to be employed with one of the projects, the at least one milestone originating from a milestone-type table, wherein the milestone is associated with a change of at least one milestone-related material and the milestone includes an amount of milestone-related material required for the project and a projected milestone start date and a projected milestone end date;

determining an actual milestone date from the milestone-type table;

calculating a material required date of milestone-related material based on the actual milestone date and the projected milestone start date and the projected milestone end date;

determining a supplier for the material from a material table;

obtaining a lead-time for supplying the material based on a suppliers table;

calculating an order date based on the material required date and the lead-time;

populating a requirements table on a dynamic basis with the calculated order date from multiple tables, each of the multiple tables having information therein, wherein populating the requirements table comprises traversing the multiple tables of the database according to the query to accumulate data necessary to populate the requirements table and populating the requirements table based on accumulated data, wherein traversing the multiple tables and accumulating the data comprises executing instructions configured to:

determine a first item needed for a project from a project table having project information for each project, the project information including the following: a reference to at least one item to be employed in connection with the project, and an identification of a project-type of the project;

determine the project-type of the project according to the project table, wherein the project-type is associated with a project-type table, the project-type table having project-type information for each project-type referenced by the project table, the project-type information comprising a list including each item to be employed in connection with the project-type, wherein the list is constructed based on:
- at least one telecommunications infrastructure requirement for the project-type;
- at least one previous project of a same project-type, and
- at least one new material requirement for the project-type based on at least one of the following: a new type of construction method, a new service, or a new regulation;

determine a second item needed according to the project type of the project from the project-type table;

determine an algorithm necessary to determine a quantity of the needed item for an item table having item information for each item referenced by the project table, the item information including a reference to an algorithm to be employed to determine a quantity of the item for a particular project;

determine specifics of the necessary algorithm form an algorithm table having algorithm information for each algorithm referenced by the item table;

obtain any inputs necessary for the algorithm from each of the multiple tables as necessary;

apply the inputs to the algorithm to determine the quantity of the needed item; and output the populated requirements table and the order date for viewing.

14. The medium of claim 13 wherein the item information further included an identification of at least one supplier, the tables further comprising a supplier table having supplier information for each supplier referenced by the item table, the supplier information including the items supplied by the supplier and information for each supplied item, the method comprising:

from the items table, determining a supplier of the needed item;

from the supplier table, obtaining lead-time information for supplying the item; and calculating an order date based on an item requirement date and the lead-time information.

15. A computer-readable medium having stored thereon computer-executable instructions for instantiating a forecasting tool for predicting future demand for quantifiable items in connection with a plurality of projects, the tool being instantiated on at least one computer in the form of a database having multiple tables, each of the multiple tables having information therein, wherein instantiating the forecasting tool comprises:

receiving a query, accessing the database having multiple tables, receiving a selection of at least one milestone to be employed with one of the projects, the at least one milestone originating from a milestone-type table, wherein the milestone is associated with at least one milestone-related material and the milestone includes an amount of milestone-related material required for the project and a projected milestone start date and a projected milestone end date;

determining an actual milestone date from the milestone-type table;

calculating a material required date of milestone-related material based on the actual milestone date and the projected milestone start date and the projected milestone end date;

determining a supplier for the material from a material table;

obtaining a lead-time for supplying the material based on a suppliers table;

calculating an order date based on the material required date and the lead-time;

populating a requirements table according to the calculated order date, and outputting the requirements table to a display, and the multiple tables comprising:

a project table having project information for each project, the project information including a reference to at least one item to be employed in connection with the project;

an item table having item information for each item referenced by the project table, the item information including a reference to an algorithm to be employed to determine a quantity of the item for a particular project; and an algorithm table having algorithm information for each algorithm referenced by the item table, the multiple tables further comprising a requirements populated by the forecasting tool on a dynamic basis with information obtained from the multiple tables in response to a query for demand for items, the tool populating the requirements table by accepting the query, traversing the multiple tables of the database according to the query to accumulate data necessary to populate the retirements table, and populating the requirements table based on the accumulated data, the project information further including and identification of a project-type of the project, the tables further comprising a project-type table having project-type information for each project-type referenced by the project table the project-type information comprising a list including each item to be employed in connection with the project-type, wherein the list is constructed based on:

at least one telecommunications infrastructure requirement for the project-type;

at least one previous project of a same project-type, and at least one new material requirement for the project-type based on at least one of the following: a new type of construction method, a new service, or a new regulation;

the project information further including at least one milestone date for the project, the tables further comprising a milestone table having milestone information for each milestone date referenced by the project-table, the milestone information including at least one key project moment to which a need for an item for the project is referenced, the item information further including a reference to the milestone information in the milestone table and information on how to calculate a date when the item is required based on the milestone information, the item information further including an identification of at least one supplier, the tables further comprising a supplier table having supplier information for each supplier referenced by the item table, the supplier information including the items supplied by the supplier and information for each supplied item, the requirements table being populated with information including a project, and item for the project, and an amount of the item required for the project, the requirements table being further populated with information including the date when the item is needed for the project, the requirements table being further populated with information including the date when the item must be ordered to satisfy the date when the item is needed, the requirements table being further populated with information including a supplier the item is to be ordered from, wherein the requirements table is outputted for viewing by personnel.

16. A computer-readable medium having stored thereon computer-executable instructions for instantiating a forecasting tool wherein instantiating the forecasting tool comprises:

receiving a query, accessing a database having multiple tables, each of the multiple tables table having information therein, receiving a selection of at least one milestone to be employed with one of the projects, the at least one milestone originating from a milestone-type table, wherein the milestone is associated with a change of at least one milestone-related material and the milestone includes an amount of milestone-related material required for the project and a projected milestone start date and a projected milestone end date;

determining an actual milestone date from the milestone-type table;

calculating a material required date of milestone-related material based on the actual milestone date and the projected milestone start date and the projected milestone end date;

determining a supplier for the material from a material table;

obtaining a lead-time for supplying the material based on a suppliers table;

calculating an order date based on the material required date and the lead-time;

populating a requirements table according to the calculated order date, and outputting the requirements table to a display, the forecasting tool comprising the multiple tables for predicting future demand for quantifiable items in connection with a plurality of projects, wherein the plurality of projects are related to installation projects in the communications industry, the multiple tables comprising:

a project table having project information for each project, the project information including a reference to at least one item to be employed in connection with the project;

an item table having item information for each item referenced by the project table, the item information including a reference to an algorithm to be employed to determine a quantity of the item for a particular project; and an algorithm table having algorithm information for each algorithm referenced by the item table, the requirements table populated by the forecasting tool on a dynamic basis with information obtained from the multiple tables in response to a query for demand for items, the tool populating the requirements table by accepting the query, traversing the tables of the database according to the query to accumulate data necessary to populate the requirements table, and populating the requirements table based on the accumulated data, wherein the requirements table is output to the display by the forecasting tool for viewing by personnel, further wherein the query input into the forecasting tool is modifiable, the project information further including an identification of a project-type of the project, the multiple tables further comprising a project-type table having project-type information for each project-type referenced by the project table, the project-type information comprising a list including each item to be employed in connection with the project-type, wherein the list is constructed based on:

at least one telecommunications infrastructure requirement for the project-type comprising at least one of: distribution equipment, subscriber service equipment, central office equipment, and intermediate breakout equipment;

at least one previous project of a same project-type, and at least one new material requirement for the project-type based on at least one of the following: a new type of construction method, a new service, or a new regulation;

the project information further including at least one milestone date for the project, the multiple tables further comprising a milestone table having milestone information for each milestone date referenced by the project table, the milestone information including at least one key project moment to which a need for an item for the project is referenced, the item information further including a reference to the milestone information in the milestone table and information on how to calculate a date when the item is required based on the milestone information, the item information further including an identification of at least one supplier, the tables further comprising a supplier table having supplier information for each supplier referenced by the item table, the supplier information including the items supplied by the supplier and information for each supplied item, the requirements table being populated with information including a project, an item for the project, and an amount of the item required for the project, the requirements table being further populated with information including the date when the item is needed for the project, the requirements table being further populated with information including the date when the item must be ordered to satisfy the date when the item is needed, the requirements table being further populated with information including a supplier the item is to be ordered from, wherein the requirements table based on the accumulated knowledge is viewed by personnel.

* * * * *